United States Patent [19]
Hansen

[11] Patent Number: 4,586,788
[45] Date of Patent: May 6, 1986

[54] AUTOMATIC DIMMING SWITCH FOR A VEHICLE ILLUMINATED VISOR

[75] Inventor: Scott A. Hansen, Holland, Mich.

[73] Assignee: Prince Corporation, Holland, Mich.

[21] Appl. No.: 585,526

[22] Filed: Mar. 2, 1984

[51] Int. Cl.4 .............................................. G02B 26/00
[52] U.S. Cl. .................................. 350/283; 296/97 B
[58] Field of Search ........................ 350/276 R, 283; 296/97 B, 97 F, 97 H

[56] References Cited

U.S. PATENT DOCUMENTS 4,227,241 10/1980 Marens ............................... 296/97 B
4,491,899 1/1985 Fleming ............................. 296/97 B Primary Examiner—John K. Corbin
Assistant Examiner—Loha Ben
Attorney, Agent, or Firm—Price, Heneveld, Huizenga & Cooper

[57] ABSTRACT

A covered illuminated vanity mirror for use in a vehicle includes a cover operated switch for actuating lights for providing illumination for the mirror. A second switch is provided and is movable for selecting high or lower levels of light intensity. To assure the level of illumination is at the lower level when the cover is initially opened, an automatic dimming system couples the second switch to the cover such that movement of the cover between an open position to a closed position causes the second switch to move to the lower intensity position.

11 Claims, 8 Drawing Figures

AUTOMATIC DIMMING SWITCH FOR A VEHICLE ILLUMINATED VISOR

BACKGROUND OF THE INVENTION

The present invention relates to illuminated, covered vanity mirrors installed in a vehicle, and particularly to an automatic dimming switch therefor.

An illuminated vanity mirror built within the body of a visor has become a popular accessory on many vehicles and standard equipment on several vehicle models. The visors provide the normal sun blocking function and in addition, provide a vanity mirror which can be illuminated for use under low ambient conditions. The mirror is covered by a protective cover to conceal the mirror when not in use. Such visor construction is disclosed in U.S. Pat. No. 4,227,241, issued Oct. 7, 1980 and entitled VISOR ASSEMBLY.

In such visor construction, lights adjacent the mirror are activated by the opening of the cover and a manually operated bright/dim switch is provided for providing two levels of illumination. When the bright/dim switch is left in the bright, or higher illumination level position, opening of the cover within the darkened interior of a vehicle can provide a level of illumination which may cause temporary night blindness and discomfort to the user. Frequently, the mirror will be illuminated at the higher level of illumination by a prior user, who does not return the switch to the low level position when use is discontinued. Due to the automatic extinguishing of the light means upon closing of the cover, the problem occurs relatively frequently.

U.S. Pat. No. 4,227,242 discloses a cover actuated switch by which the level of illumination is controlled by the cover to initially provide a low level of intensity and subsequently a higher level as the cover is moved to a second position. Although this structure will, if the cover is controlled manually between different positions, reduce undesired night blindness by initially actuating the light source in a low intensity position, it requires the user to actively control the cover position instead of merely flipping open the cover as is typical. Also, although bright and dim levels of illumination is provided, they cannot be manually selected except by movement of the cover. Thus, the system does not employ a separate and distinct manually operated intensity level controlling switch but relies on the mirror cover position control.

SUMMARY OF THE PRESENT INVENTION

The system of the present invention overcomes the night blindness and discomfort caused by the operation of the visor illumination means in the high brightness mode by providing an automatic dimming switch activated upon movement of the cover from an open to a closed position which automatically provides a lower level of illumination upon reopening of the cover and activation of the light means. In a preferred embodiment of the present invention, a bright/dim switch is provided for allowing a user to manually switch between bright and low level intensities and means coupling the cover to the switch are provided for returning the switch to the low level intensity position upon closing of the cover.

In a preferred embodiment of the invention, a mechanical dial cord is coupled between a movable element on the cover assembly and the switch for physically moving the switch to the dim position upon movement of the cover from an open to a closed position in the event the switch has been manually moved to a bright position.

With such construction, when the visor cover is opened, the illuminated mirror will always be illuminated initially at a low level intensity thereby obviating the night blindness and discomfort attendant to switching from a darkened condition to a high intensity illumination condition when the switch would otherwise be left in a high intensity position.

These and other features, objects and advantages of the present invention will become apparent upon reading the following description thereof together with reference to the accompanying drawings in which:

DETAILED DESCRIPTION OF THE PREFERRED EMBODIMENT

Figure 1:
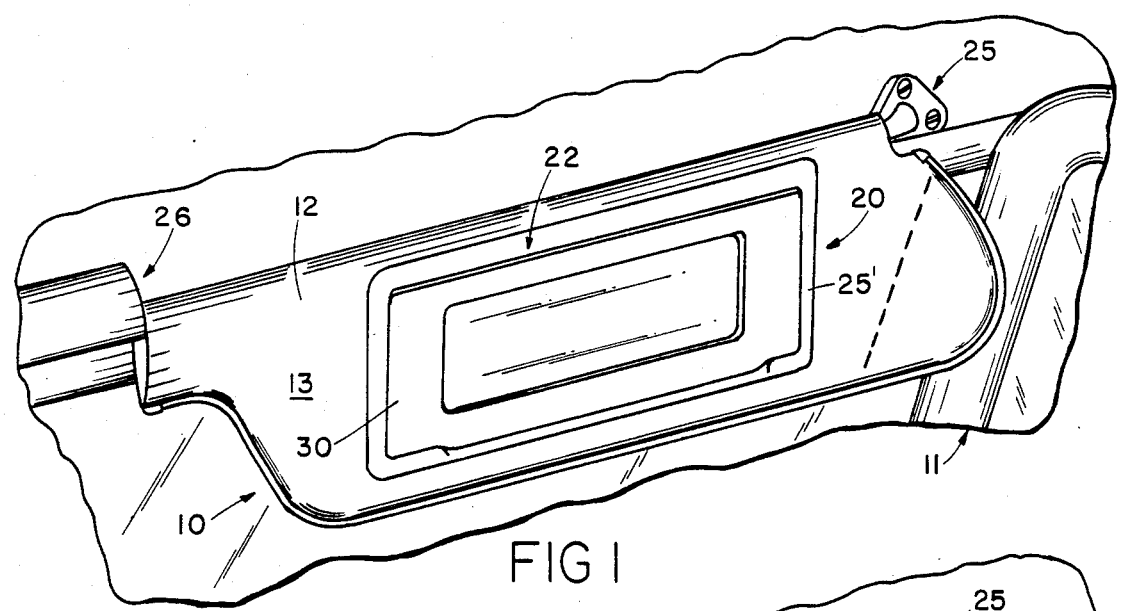
FIG. 1 is a fragmentary, perspective view of a visor embodying the present invention.
Figure 2:
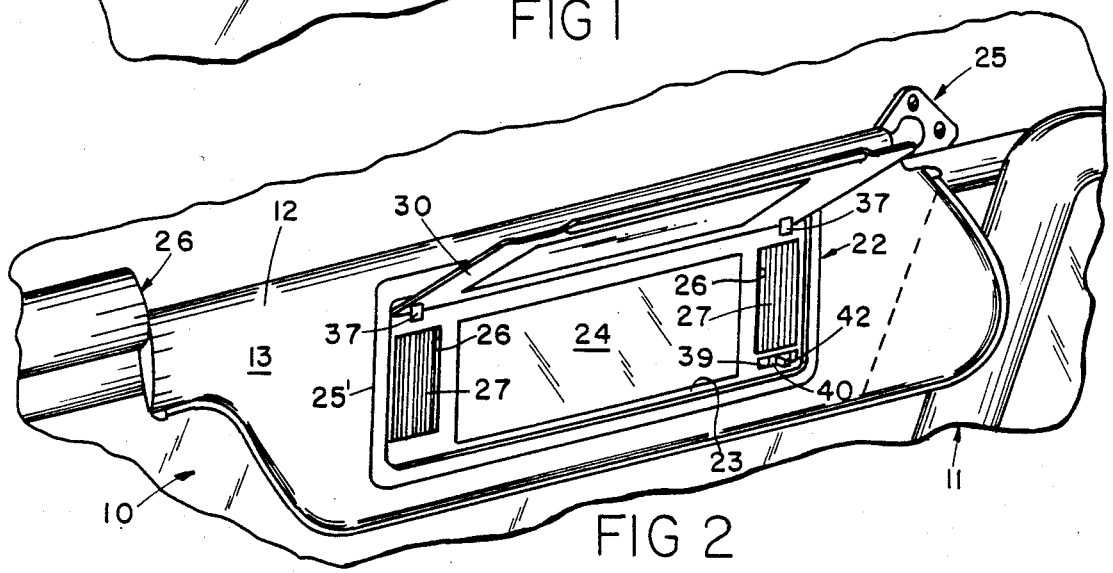
FIG. 2 is a fragmentary, perspective view of the visor shown in FIG. 1 showing the cover in an open position.

Referring initially to FIGS. 1 and 2, a visor 10 is disclosed incorporating the present invention and is shown mounted on the passenger, or right, side of a vehicle 11 such as an automobile. The visor comprises a visor body 12 made of a core member injection molded of suitable polymeric material such as polypropylene and including a central, rectangular recess formed in the rearward facing side when the visor is lowered for receiving an illuminated visor mirror frame mirror assembly 20. The visor core is covered by a suitable upholstery material 13 to conform the visor appearance to that of the vehicle's interior. A visor rod mounting mechanism extends within the visor body along the top edge thereof and includes an elbow bracket assembly 25 for mounting one end of the visor to the vehicle for pivoting between a raised, stored position and a lowered, use position, illustrated in the Figures. The opposite, or left, end of the visor shown includes a post (not shown) which releasably fits within a socket 26 permitting movement of the visor body from the windshield area, illustrated in the Figures, to the side of the vehicle, as desired.

The visor mirror assembly 20 comprises a generally rectangular frame 22 having a central, rectangular opening 23 behind which there is mounted a mirror 24 (FIG. 2). The frame 22 integrally includes a peripheral trim flange 25' which surrounds the frame and extends over the edge of the recess formed in the visor body when assembly 20 is mounted, as shown in FIGS. 1 and 2. On opposite sides of opening 23 and mirror 24, there is provided a pair of vertically oriented, rectangular openings 26 for receiving snap-fitted lenses 27. Lamps are positioned behind the lenses, as described below, for directing illumination toward the face of the user to permit use of the mirror 24 under low ambient light conditions. A cover 30 is pivotally coupled to frame 22 and is held in a closed position, as illustrated in FIG. 1, or an open position, as illustrated in FIG. 2, by an over-center spring construction, partially illustrated in FIGS. 3 and 5. The cover mounting structure includes a pair of tension springs 32 at opposite sides of the cover. Each spring has one end 33 anchored through an aperture in a corner 34 of cover 30 and an opposite end anchored to a post 36 located on the rear side of flange 25'. Cover 30 and frame 22 include a snap-in socket and pin assembly 37 for pivotally intercoupling the cover to the frame at opposite upper edges of the cover. This construction is described in greater detail in U.S. Patent application Ser. No. 646,476, filed Feb. 7, 1983, and entitled VISOR COVER ASSEMBLY, the disclosure of which is incorporated herein by reference.

Figure 8:
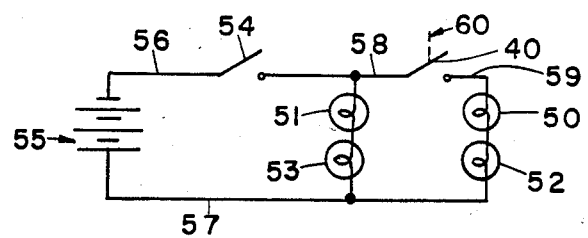
FIG. 8 is an electrical circuit diagram in schematic form of the circuit embodying the present invention.
Figure 7:
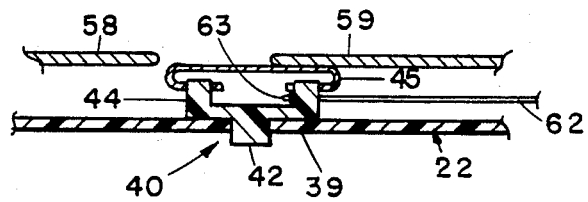
FIG. 7 is an enlarged, fragmentary, cross-sectional view of the switch means shown in FIG. 3 taken along section line VII—VII of FIG. 3.

As best seen in FIGS. 2 and 7, mounted to the lower, righthand corner of frame 22 is a single-pole single-throw slide switch 40 which includes a stem 42 (FIG. 7) extending outwardly through a slot 39 on the face of frame 22 below the rightside lens 27. Switch 40 is employed, as best seen by the circuit diagram of FIG. 8, for activating a pair of lamps 50 and 52 which are wired in series with one another, as seen, with the combination coupled in parallel with lamps 51 and 53 when switch 40 is in a closed position.

A cover actuated switch 54 (FIG. 8) couples lamps 51 and 53 to the vehicle operating power source, such as battery 55, by a suitable wiring harness, illustrated schematically as conductors 56 and 57 typically coupled to the battery through the vehicle's instrument panel in a conventional fashion. Thus, switch 54 operates to close when cover 30 is moved from a closed position, shown in FIG. 1, to an open position, shown in FIG. 2, to apply power to the parallel circuit of lamps 51, 53 and 50, 52. As can be appreciated, when the bright/dim switch 40 has been manually moved to the closed position, all four lamps will simultaneously actuate. To prevent initial actuation in this high intensity mode in which four lamps are actuated, the automatic dimming means of the present invention is employed.

Figure 5:
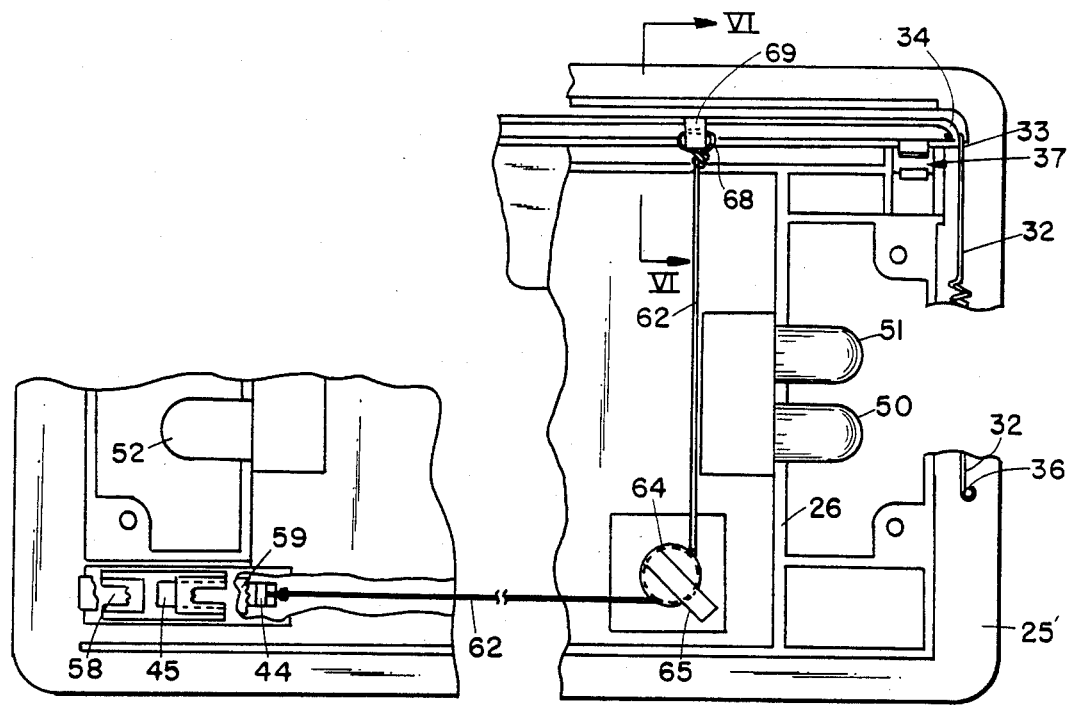
FIG. 5 is an enlarged, fragmentary, partly broken away, rear view of the illuminated vanity mirror assembly shown with the cover in a closed position.

The structure for assuring switch 40 is moved to the low intensity open position when the cover is closed includes, in the preferred embodiment, means 60 for mechanically moving switch 40 from a closed position to an open position when the cover is closed. As can be seen with reference to FIG. 7, switch 40 is a slide switch with stem 42 being coupled to a generally U-shaped switch body 44 made of a nonconductive plastic material. Body 44 supports a shorting conductive strip 45 which moves between the position shown in FIGS. 3 and 7, shorting out conductive elements 58 and 59 which couple lamps 50, 52 in parallel with lamps 51, 53 in the high intensity position. Switch 40 moves to the right, as shown in FIGS. 5 and 7, (to the left in FIG. 2) to open and decouple lamps 50 and 52 in the low intensity position. In order to assure the switch always moves from the high intensity closed position to the low intensity open position a dial cord 62 couples the switch to the cover. Cord 62 is made of a suitable, low stretch, polymeric material, such as NYLON and is anchored at one end 63 to one leg of the switch body 44 by means of extending the dial cord through an aperture and knotting the cord to the body 44 of the switch, as illustrated in FIG. 7, or by other suitable anchoring means.

The dial cord 62 extends along the lower edge and behind frame 22 through a cheek block 64 mounted to the rear of a circuit panel 28 for changing the direction of the dial cord 62 toward the top edge 31 of cover 30. Block 64 includes a bail 65 for constraining cord 62 therein. The end 68 of cord 62 is then secured to a mounting boss 69, integrally formed on the edge 31 of cover 30 by tying or other suitable means. If desired, a suitable tension spring 67 can be inserted in series with cord 62, as indicated in FIG. 3, to take up any slack in the cord.

Figure 4:
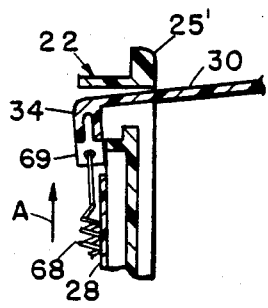
FIG. 4 is a enlarged, fragmentary, cross-sectional view of a portion of the structure shown in FIG. 3 taken along section line IV—IV of FIG. 3.
Figure 3:
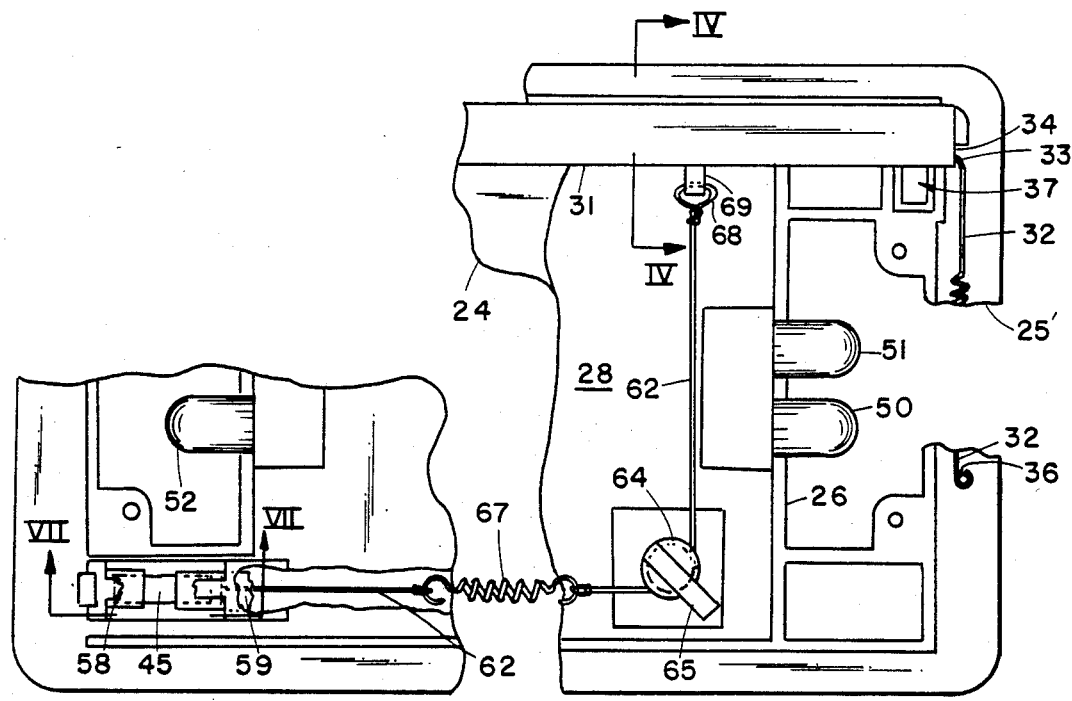
FIG. 3 is an enlarged, fragmentary, partly broken away, rear view of the illuminated vanity mirror assembly employed in the visor shown in FIGS. 1 and 2 showing the cover in an open position.

The operation of the automatic dimming system can best be understood by reference initially to FIGS. 3 and 4 which show the switch in a selected high position for providing higher level illumination during use of the mirror and the cover 30 in an open position. In this position, switch 40 is closed and moved to the leftmost position in FIG. 7, and boss 69 on edge 31 of the cover is lowered somewhat from the top edge of the frame 22. In this position, dial cord 62 is held taut by spring 68 but does not exert a force on switch 40 sufficient to cause it to move from the selected high position.

Figure 6:
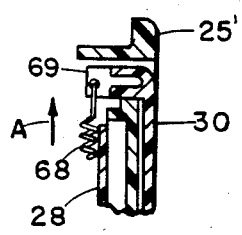
FIG. 6 is a fragmentary, cross-sectional view of a portion of the structure shown in FIG. 5 taken along section line VI—VI in FIG. 5.

As the cover is moved from the open position, shown in FIGS. 3 and 4, to a closed position, shown in FIGS. 5 and 6, boss 69 moves upwardly in a direction indicated by arrow A in FIGS. 4 and 6 through a distance of approximately ⅜ of an inch. This, in turn, moves dial cord 62 about cheek block 64 an equivalent distance causing switch 54 to be moved to the right, as illustrated in FIGS. 5 and 7. This causes switch 40 to open, disconnecting lamps 50 and 52 such that when the cover is opened and switch 54 closed, only the low intensity lamps 51 and 53 will be activated. When the cover is opened, mounting boss 69 moves downwardly in a direction opposite arrow A reducing the tension on dial cord 62 a sufficient amount to allow the user to move switch 40, if desired, to a high intensity position. Naturally, if switch 40 is left in the low intensity position, the automatic dimming mechanism 60 does not operate to change its position.

It will become apparent to those skilled in the art that various modifications to the preferred embodiment of the invention can be made without departing from the spirit or scope of the present invention as defined by the appended claims.

The embodiments of the invention in which an exclusive property or privilege is claimed are defined as follows.

1. An illuminated covered mirror assembly for use in a vehicle comprising:

a mirror;

support means for said mirror and including illumination means adjacent said mirror for directing illumination outwardly therefrom;

a cover mounted on said support means for continuous movement between a fully closed position over said mirror and a fully open position exposing said mirror for use;

electrical circuit means including first switch means positioned to be actuated only by said cover when moved to an open position for supplying operating power to said illumination means, said electrical circuit means further including second switch means including an element positioned to be manually moved by a user between high and low positions for controlling the intensity of illumination between high and low levels, respectively; and means coupling said cover to said second switch means for moving said second switch means from said high position to said low position in response to movement of said cover from an open to a closed position.

2. The apparatus as defined in claim 1 wherein said illumination means includes a plurality of lamps with at least one lamp coupled to said second switch means to be actuated only when said second switch means is in the high position.

3. The apparatus as defined in claim 2 wherein said coupling means comprises a dial cord.

4. An illuminated covered mirror assembly for use in a vehicle comprising:

a mirror;

support means for said mirror and including illumination means adjacent said mirror for directing illumination outwardly therefrom;

a cover mounted on said support means for movement between a closed position over said mirror and an open position exposing said mirror for use;

electrical circuit means including first switch means positioned to be actuated by said cover when moved to an open position for supplying operating power to said illumination means, said electrical circuit means including second switch means including an element positioned to be manually moved by a user between high and low positions for controlling the intensity of illumination between high and low levels, respectively wherein said illumination means includes a plurality of lamps with at least one lamp coupled to said second switch meas to be actuated only when said second switch means is in the high position; and coupling means including a dial cord for coupling said cover to said second switch means for moving said second switch means from said high position to said low position as said cover is moved from an open to a closed position, wherein said coupling means further includes a cheek block for changing the direction of travel of said dial cord between said second switch means and said cover.

5. The apparatus as defined in claim 4 wherein said coupling means further includes tension spring means in series with said dial cord.

6. A lighted and covered mirror assembly for a vehicle visor comprising:

a mirror frame including a mirror mounted therein;

lamp means and means for mounting said lamp means adjacent said mirror for directing illumination outwardly therefrom;

cover means movably attached to said mirror frame for movement between a fully closed position covering said mirror and a fully opened position exposing said mirror;

circuit means for applying electrical power to said lamp means including first switch means actuated only by said cover means when moved from said closed position to said open position;

second user actuated dimming switch means mounted to said mirror frame and coupled to said circuit means for permitting a user to select a low or a high intensity level of illumination; and means coupling said second switch means to said cover for moving said second switch means to a low intensity level position in response to movement of said cover from an open position to a closed position.

7. The apparatus as defined in claim 6 wherein said coupling means comprises a dial cord.

8. The apparatus as defined in claim 7 wherein said illumination means includes a plurality of lamps with at least one lamp coupled to said second switch means to be actuated only when said second switch means is in the high position.

9. A lighted and covered mirror assembly for a vehicle visor comprising:

a mirror frame including a mirror mounted therein;

lamp means and means for mounting said lamp means adjacent said mirror for directing illumination outwardly therefrom;

cover means movably attached to said mirror frame for movement between a closed position covering said mirror and an opened position exposing said mirror;

circuit means for applying electrical power to said lamp means including first switch means actuated by said cover means when moved from said closed position to said open position;

second user actuated switch means mounted to said mirror frame and coupled to said circuit means for permitting a user to select a low or a high intensity level of illumination wherein said lamp means includes plurality of lamps with at least one lamp coupled to said second switch means to be actuated only when said second switch means is in the high position; and coupling means including a dial cord for coupling said second switch means to said cover for moving said second switch means to a low intensity level position when said cover is moved from an open position to a closed position, wherein said coupling means further includes a cheek block for changing the direction of travel of said dial cord between said second switch means and said cover.

10. The apparatus as defined in claim 9 wherein said coupling means further includes tension spring means in series with said dial cord.

11. An illumination control for an illuminated mirror assembly for use in a vehicle comprising:

a mirror with illumination means adjacent said mirror for directing illumination outwardly therefrom;

means for concealing said mirror and illumination means when not in use;

electrical circuit means including first switch means coupled to said concealing means for supplying operating power to said illumination means only when said mirror is not concealed, and second switch means movable between first and second positions and coupled to said illumination means for controlling the intensity of illumination between high and low levels, respectively; and means coupling said second switch means to said concealing means such that said second switch means is moved from said first position to said second position when said mirror and illumination means are concealed.

* * * * *

UNITED STATES PATENT AND TRADEMARK OFFICE
CERTIFICATE OF CORRECTION

PATENT NO.   : 4,586,788
DATED        : May 6, 1986
INVENTOR(S)  : Scott A. Hansen It is certified that error appears in the above-identified patent and that said Letters Patent is hereby corrected as shown below:

Column 2, line 25:
   "a" should be --an--;

Column 5, line 39:
   "meas" should be --means--;

Column 6, line 33:
   after "includes" insert --a--.

Signed and Sealed this

Second Day of September 1986

[SEAL]

Attest:

Attesting Officer

DONALD J. QUIGG

Commissioner of Patents and Trademarks